Dec. 24, 1935.  J. M. TAUBER  2,025,537

MOWER

Filed March 16, 1932  2 Sheets-Sheet 1

Inventor
Joseph M. Tauber,

Witness:

Dec. 24, 1935. J. M. TAUBER 2,025,537
MOWER
Filed March 16, 1932 2 Sheets-Sheet 2
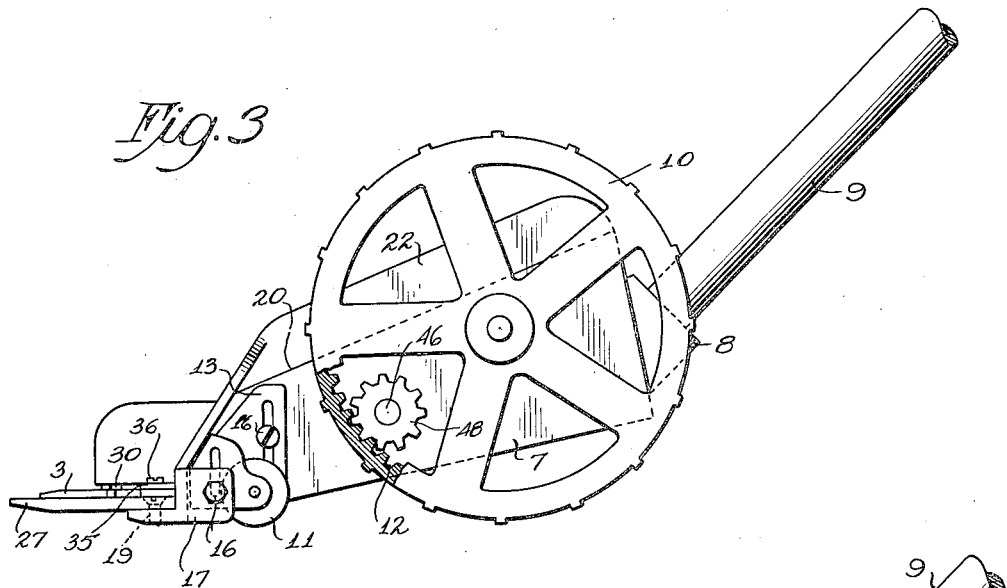
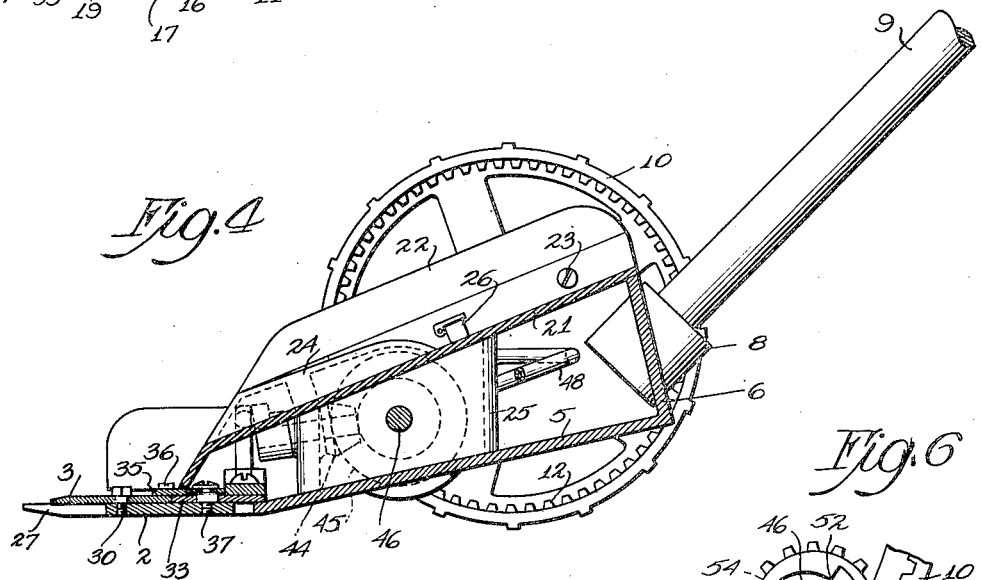
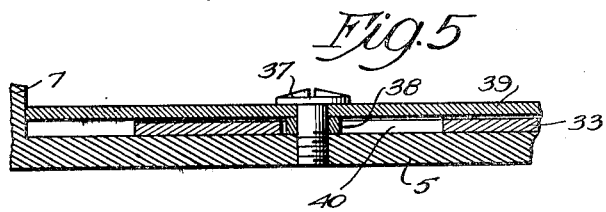
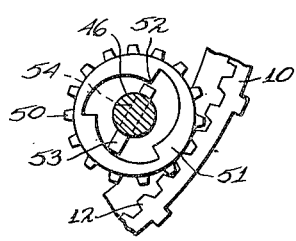

Patented Dec. 24, 1935

2,025,537

UNITED STATES PATENT OFFICE 2,025,537

MOWER

Joseph M. Tauber, Chicago, Ill.

Application March 16, 1932, Serial No. 599,085

3 Claims. (Cl. 56—246)

The main objects of this invention are to provide a lawn mower having a fixed cutter blade provided with an improved form of teeth adapted to hold the grass in proper cutting position; to provide improved movable cutters coacting with said teeth; to provide improved means for oscillating said movable cutters; to provide improved means for preventing clogging of said oscillating means; and to provide improved means for adjusting the height of said cutter blade to regulate the depth of cut.

An illustrative embodiment of this invention is shown in the accompanying drawings, wherein:

Fig. 3 is a side elevation of the mower, taken from the right of Fig. 1.

Fig. 4 is a vertical section, taken on the line 4—4 of Fig. 1.

Fig. 5 is an enlarged section, taken on the line 5—5 of Fig. 1.

Fig. 6 is an enlarged detail in elevation showing the connection between the traction wheels and the cutter actuating mechanism.

Figure 1:
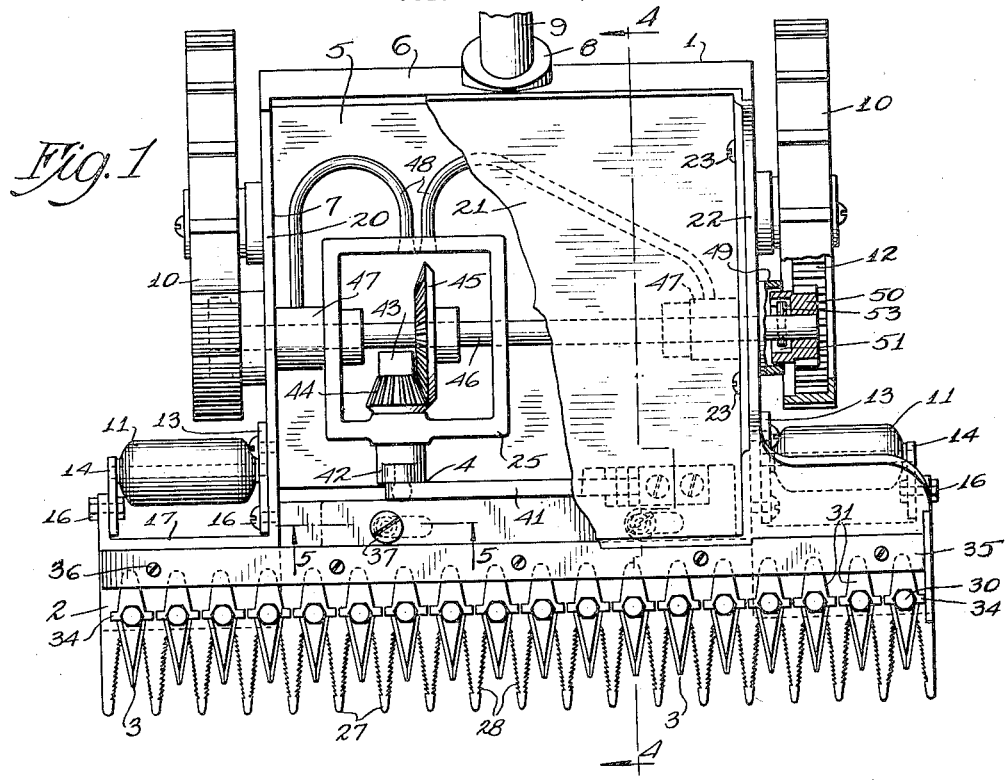
Figure 1 is a top plan of a mower, with parts thereof broken away.

In the construction shown, the improved mower comprises a carriage 1, on which is mounted a fixed cutter blade 2, which supports a plurality of oscillatory cutters 3 which are oscillated by actuating mechanism 4.

In the form illustrated, the carriage 1 comprises a housing having a bottom 5, rear wall 6, and side walls 7. Formed on the rear wall 6, is a boss 8 forming a socket for receiving a handle 9 by which the mower may be trundled along the ground. The mower may, however, be power driven.

The carriage is supported by a pair of rear traction wheels 10 and a pair of forward rollers 11. The traction wheels 10 are provided with internal gears 12 for driving the cutter actuating mechanism. The rollers 11 are journaled in bearing plates 13 and 14 which are provided with vertically disposed slots 15 for receiving bolts 16 mounted on substantially U-shaped brackets 17 formed at the forward end of the carriage. Due to these pin and slot connections, the rollers 11 may be bodily adjusted vertically so as to regulate the height of the fixed cutter blade 2, and the two journals of each roller may be independently adjusted vertically. Formed on these brackets 17, are forwardly extending shelves 18 to which the blade 2 is detachably secured by screws 19.

The side walls 7 are tapered and the upper inclined edges 20 thereof support a cover plate 21 in position to form a runway which inclines rearwardly and upwardly from the cutters for directing the mown grass over the rear wall 6. This runway is described and claimed in my Patent No. 1,763,831 issued June 17, 1930. Flanges 22 are formed at the sides of the cover plate, and these are offset, as shown in Fig. 1, so as to be positioned in the vertical planes of the side walls 7. The cover plate may be secured to the side walls 7 by screws 23.

A portion of the cover plate is raised to provide a hood 24 which covers a gear housing 25 which is formed on the base 5. A suitable lubricant may be injected into the gear housing 25 through a cup 26 mounted on the cover plate.

Figure 2:
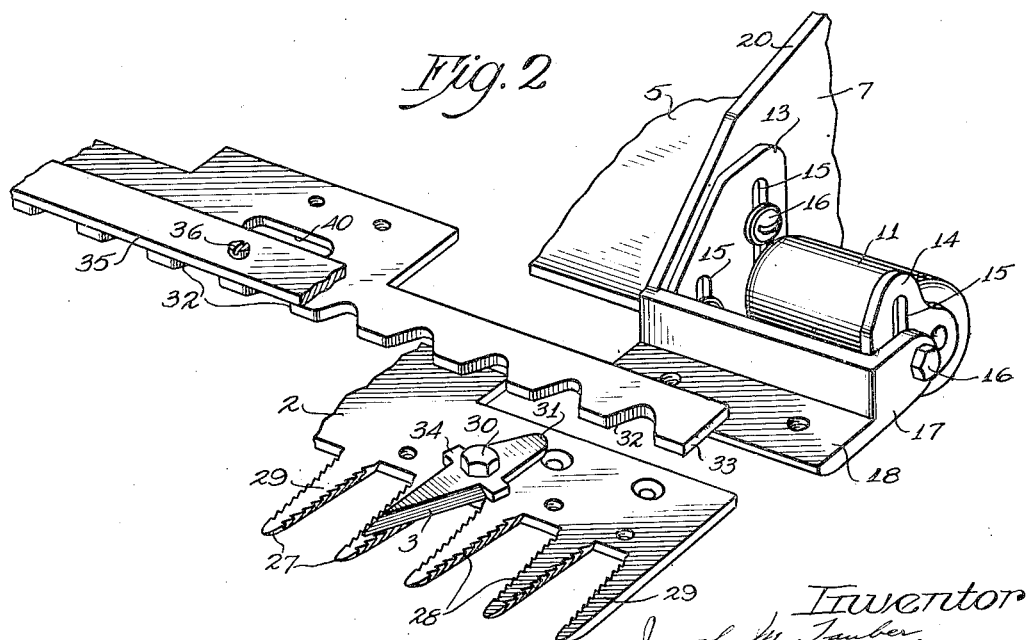
Fig. 2 is an enlarged fragmentary perspective view showing certain portions of the mower.

In the improved form shown, the fixed cutter blade 2 is provided with a row of forwardly projecting teeth 27, which are spaced from one another, as shown in Fig. 2. These teeth are serrated along their side edges to provide ridges 28 which prevent the grass from falling forwardly after it has entered the spaces between the teeth. The teeth 27 are tapered forwardly and downwardly and the serrations 28 are tapered downwardly and rearwardly.

The upper surfaces of the teeth are flat so as to provide bearing surfaces 29 located in a single plane and adapted to coact with the oscillatory cutters 3.

The oscillatory cutters are pivotally secured to the fixed cutter blade by screws 30 which are arranged in a single row. These screws are staggered with respect to the teeth 27 so that each movable cutter is adapted to coact with the opposed cutting edges of two adjacent fixed teeth on the blade 2, as clearly shown in Fig. 2. The sides of these cutters are preferably tapered forwardly and upwardly.

Formed on the rear ends of the movable cutters, are tongues 31, which extend into recesses 32 formed in the forward edge of a reciprocating bar 33 which forms part of the actuating mechanism.

Extending laterally from the side edges of the movable cutters, are fingers 34 which are intended to serve as obstructions to prevent any of the mown grass from entering the recesses 32 or passing between the cutter blade 2 and the reciprocating bar 33. These fingers are alined with the pivot screws 30, as shown in Fig. 1.

The reciprocating bar 33 is slidably mounted on the fixed cutter blade 2. Mounted on the upper face of this bar, is a strip 35 which extends over the recesses 32 to prevent the movable cutters from jumping out of the recesses in the event that the screws 30 become loose. This strip also prevents grass from falling into the recesses. It may be secured to the reciprocating bar 33 by screws 36.

The cutter actuating bar 33 is guided by a pair of rollers 38 journaled on screws 37 which are mounted on the carriage base 5. Supported on these rollers 38, is a guide bar 39. The rollers extend through slots 40 in the reciprocating bar 33 and they are of greater thickness than the reciprocating bar, as shown in Fig. 5, so as to hold the guide bar 39 out of contact with the reciprocating bar.

The actuating mechanism includes a rod 41 connected to the reciprocating bar 33 and to a crank 42 mounted on a shaft 43 journaled in the housing 25. Mounted on the shaft 43, is a beveled pinion 44 meshing with a beveled gear 45 fixed on a shaft 46 which is journaled in bearings 47 formed on the carriage walls 7. Tubes 48 conduct some of the lubricant from the gear housing to the bearings 47.

Formed on the outer faces of the side walls 7, in axial alinement with the bearings 47, are cups 49 which house a pair of pinions 50 loosely mounted on the ends of the shaft 46 and meshing with the internal gears 12 of the traction wheels. These pinions are provided with hub portions 51 having internal ratchets 52 adapted to engage pins 53 which are loosely seated in slots 54 extending through the drive shaft 46. With this construction, upon the forward movement of the mower, the ratchets 52 engage the pins 53 for driving the shaft 46, and, upon the backward movement of the mower, the ratchets 52 merely reciprocate the pins 53.

In operation, in trundling the mower forwardly, the cutters 3 are oscillated through the action of the reciprocating bar 33. The cutters 3 and fingers 27 coact to cut the grass with a scissors action and the serrations 28 serve to hold the grass in position to be cut.

Although but one specific embodiment of this invention has been herein shown and described, it will be understood that details of the construction shown may be altered or omitted without departing from the spirit of the invention as defined by the following claims:—

I claim as my invention:

1. A mower comprising a carriage, a unitary cutter blade fixed on the forward end of said carriage and having a plurality of forwardly projecting teeth provided with unindented and unobstructed flat upper bearing surfaces disposed entirely in a single plane, a row of cutters pivotally mounted on said unitary blade and slidably engaging said bearing surfaces, said cutters being spaced apart laterally, fingers integrally formed on the side edges of said cutters and projecting laterally beyond said side edges for obstructing the spaces between said cutters to prevent the passage of mown grass between the rear ends of said cutters, said fingers being adapted to be located in a substantially straight line when said cutters point forwardly, and mechanism for oscillating said cutters.

2. A mower comprising a carriage, a cutter blade fixed on the forward end of said carriage and having a plurality of forwardly projecting teeth provided with unindented and unobstructed flat upper bearing surfaces disposed in a single plane, a row of cutters pivotally mounted on said blade and slidably engaging said bearing surfaces, said cutters being spaced apart laterally, fingers integrally formed on the side edges of said cutters and projecting laterally beyond said side edges for obstructing the spaces between said cutters to prevent the passage of mown grass between the rear ends of said cutters, said fingers being substantially alined with the pivotal axes of said cutters, and mechanism for oscillating said cutters.

3. A mower comprising a carriage, a unitary cutter blade fixed on the forward end of said carriage and having a plurality of forwardly projecting teeth provided with unindented and unobstructed flat upper bearing surfaces disposed in a single plane, a plurality of cutters pivotally mounted on said blade and slidably engaging said bearing surfaces, said cutters having rearwardly extending tongues, a reciprocating bar mounted on said unitary cutter blade and having recesses in the forward edge thereof for receiving said tongues, a guide bar mounted above said reciprocating bar and secured to said unitary cutter blade, and laterally extending fingers integrally formed on the side edges of said pivoted cutters adapted to prevent the passage of mown grass into said recesses, said fingers being alined with the pivotal axes of said cutters.

JOSEPH M. TAUBER.